(12) United States Patent
Haye

(10) Patent No.: US 10,759,543 B1
(45) Date of Patent: Sep. 1, 2020

(54) DETECTION SYSTEM FOR GAS TURBINE ENGINE

(71) Applicant: United Technologies Corporation, Farmington, CT (US)

(72) Inventor: Sheridon Everette Haye, Mansfield, CT (US)

(73) Assignee: Raytheon Technologies Corporation, Farmington, CT (US)

(*) Notice: Subject to any disclaimer, the term of this patent is extended or adjusted under 35 U.S.C. 154(b) by 0 days.

(21) Appl. No.: 16/386,588

(22) Filed: Apr. 17, 2019

(51) Int. Cl.
| | | |
|---|---|---|
| *B64D 29/08* | (2006.01) | |
| *B64D 45/00* | (2006.01) | |
| *B64D 27/12* | (2006.01) | |
| *B64F 5/60* | (2017.01) | |
| *G01N 21/94* | (2006.01) | |

(52) U.S. Cl.
CPC ............. *B64D 29/08* (2013.01); *B64D 27/12* (2013.01); *B64D 45/00* (2013.01); *B64F 5/60* (2017.01); *G01N 21/94* (2013.01); *B64D 2045/0085* (2013.01)

(58) Field of Classification Search
CPC ........ B64D 29/08; B64D 27/12; B64D 45/00; B64D 2033/022; B64D 2045/0085; B64F 5/60; G01N 21/94; G01V 8/20; G01S 17/026; G01S 17/06; F01D 21/003; F05D 2260/80; F05D 2270/804; G01M 15/14; F02C 7/052; F02C 7/04
See application file for complete search history.

(56) References Cited

U.S. PATENT DOCUMENTS

| | | | | |
|---|---|---|---|---|
| 3,874,238 | A * | 4/1975 | Compton | G01K 13/02 374/100 |
| 4,092,537 | A * | 5/1978 | Stewart | F01D 21/003 378/51 |
| 10,351,258 | B1* | 7/2019 | Barnes | B64D 45/00 |
| 2009/0112519 | A1* | 4/2009 | Novis | F01D 21/003 702/183 |
| 2010/0073173 | A1 | 3/2010 | Zindy et al. | |
| 2010/0292905 | A1* | 11/2010 | Agrawal | F02C 9/00 701/100 |
| 2010/0313639 | A1* | 12/2010 | Khibnik | F01D 17/24 73/112.01 |
| 2011/0041474 | A1* | 2/2011 | Gerez | B64D 45/00 60/223 |
| 2011/0199482 | A1* | 8/2011 | Morgan | H04N 5/2251 348/143 |
| 2015/0330310 | A1* | 11/2015 | deGaribody | G01S 17/58 701/100 |
| 2017/0219699 | A1* | 8/2017 | Shepard | G01S 7/415 |
| 2018/0002034 | A1* | 1/2018 | Khawam | B64D 47/06 |
| 2018/0068498 | A1* | 3/2018 | Hodge | B64D 45/00 |
| 2019/0094358 | A1* | 3/2019 | Wos | G01S 17/026 |

\* cited by examiner

*Primary Examiner* — Steven Whitesell Gordon
(74) *Attorney, Agent, or Firm* — Bachman & LaPointe, P.C.

(57) ABSTRACT

An optical foreign object detection (FOD) system for a gas turbine engine includes a multiple of emitters arranged about an inner periphery of a fan cowl, a multiple or receivers arranged about the inner periphery of the fan cowl, each of the multiple of receivers receiving a beam from one of the multiple of emitters to form a beam matrix; and a control system in communication with the multiple of emitters and the multiple of receivers, the control system operable to detect a minimum sized object in response to breaking at least one beam of the beam matrix.

18 Claims, 9 Drawing Sheets

DETECTION SYSTEM FOR GAS TURBINE ENGINE

BACKGROUND

The present disclosure relates to a gas turbine engine and, more particularly, to an detection system at least partially integrated into a nacelle assembly.

Aircraft engines can be damaged by Foreign Object Debris (FOD). Large objects, for example a large bird strike, can cause significant changes that can be detected by monitoring systems, such as shaft vibration. Smaller objects however, such as small birds, can cause damage that is barely visible but may still damage or weaken the blade. Regular inspection is thus performed to determine if any such damage has occurred such that maintenance can be performed.

SUMMARY

A detection system for a gas turbine engine according to one disclosed non-limiting embodiment of the present disclosure includes a multiple of emitters arranged about an inner periphery of a nacelle assembly; a multiple or receivers arranged about the inner periphery of the nacelle assembly, each of the multiple of receivers receiving a beam from one of the multiple of emitters to form a beam matrix; and a control system in communication with the multiple of emitters and the multiple of receivers, the control system operable to detect a minimum sized object in response to breaking at least one beam of the beam matrix.

A further aspect of the present disclosure includes that each beam is up to 5000 mW (5 watts) in power.

A further aspect of the present disclosure includes that each beam is about 0.125 inches (3.175 mm) in diameter.

A further aspect of the present disclosure includes 1, wherein each beam is a laser beam.

A further aspect of the present disclosure includes that each beam is in the infrared spectrum.

A further aspect of the present disclosure includes that the beam matrix is rectilinear.

A further aspect of the present disclosure includes that the minimum sized object is 1 square inch.

A further aspect of the present disclosure includes that the beams are arranged about the inner periphery of an inlet cowl of the nacelle assembly.

A further aspect of the present disclosure includes that the beams are arranged to detect the minimum damaging sized object only outside of a minimum diameter.

A further aspect of the present disclosure includes that the minimum diameter is greater than 10-30% of the diameter of the inner periphery.

An inlet cowl for a gas turbine engine according to one disclosed non-limiting embodiment of the present disclosure includes a multiple of emitters arranged about an inner periphery of the inlet cowl, the multiple of emitters located in a common plane transverse to a central axis of the inlet cowl; and a multiple or receivers arranged about the inner periphery of the inlet cowl within the common plane, each of the multiple of receivers operable to receive a laser beam from one of the multiple of emitters, the multiple of emitters and the multiple or receivers arranged to form a beam matrix to detect a minimum sized object.

A further aspect of the present disclosure includes that the beam matrix is rectilinear.

A further aspect of the present disclosure includes that the beams are arranged to detect the minimum damaging sized object only outside of a minimum diameter, the minimum diameter greater than 10%-30% of the diameter of the inner periphery.

A further aspect of the present disclosure includes that the minimum sized object is equivalent in size to that of a sparrow.

A method of foreign object debris (FOD) detection for a gas turbine engine, according to one disclosed non-limiting embodiment of the present disclosure includes illuminating a beam matrix arranged to detect a minimum sized object; identifying breaking of at least one beam of the beam matrix; and recording the breaking of the at least one beam.

A further aspect of the present disclosure includes that illuminating the beam matrix comprises directing the beams around the inner periphery of an inlet cowl.

A further aspect of the present disclosure includes that illuminating the beam matrix comprises arranging the beam to detect the minimum damaging sized object only outside of a minimum diameter, the minimum diameter greater than 10%-30% of the diameter of the inner periphery.

A further aspect of the present disclosure includes that illuminating the beam matrix comprises forming a rectilinear beam matrix.

A further aspect of the present disclosure includes that the recording comprises setting a bit in a control system.

A further aspect of the present disclosure includes that the recording comprises communicating with a Health and Usage Monitoring Systems (HUMS).

The foregoing features and elements may be combined in various combinations without exclusivity, unless expressly indicated otherwise. These features and elements as well as the operation thereof will become more apparent in light of the following description and the accompanying drawings. It should be appreciated that the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
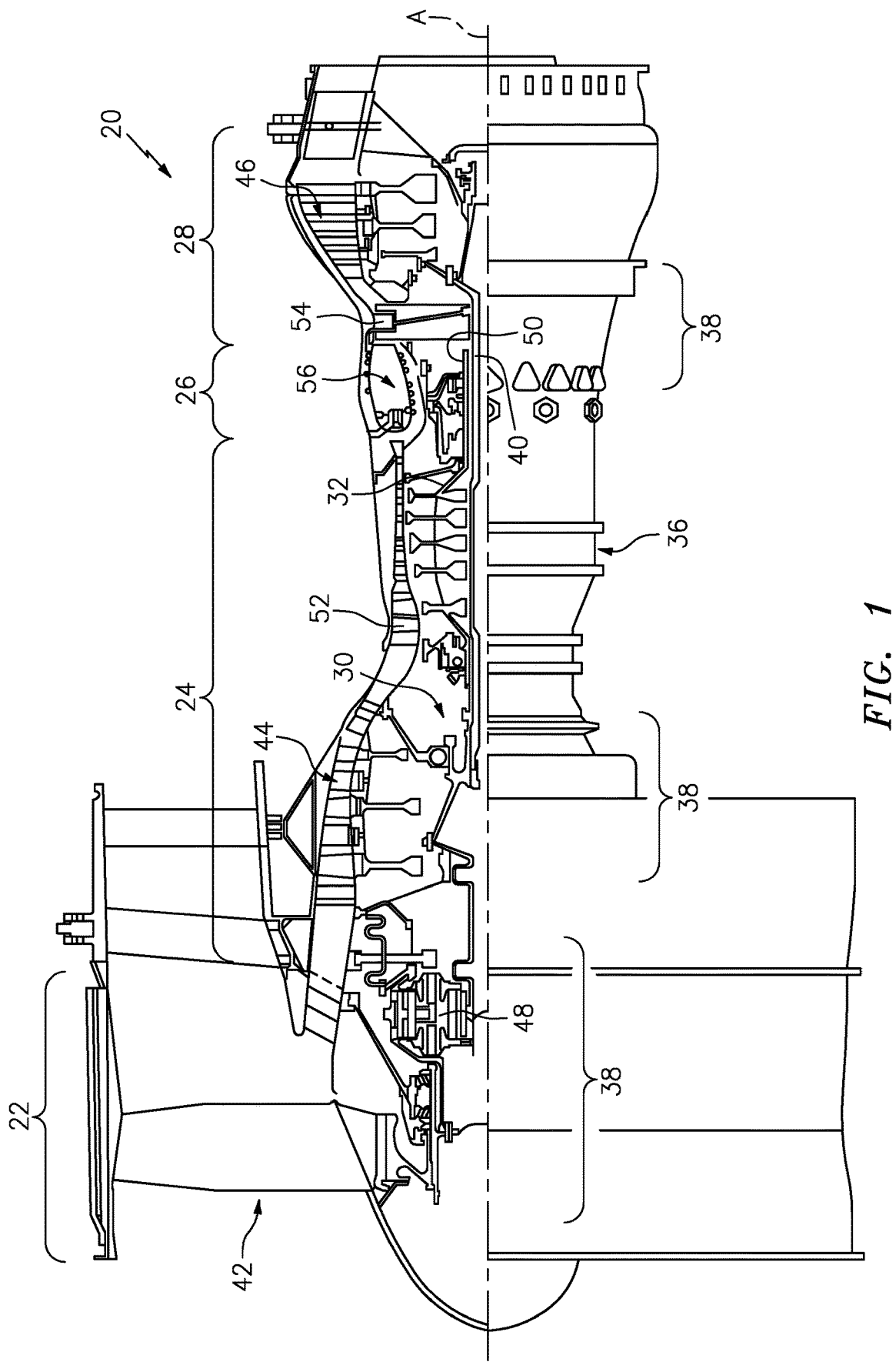
FIG. 1 is a schematic cross-section of a gas turbine engine.

FIG. 1 schematically illustrates a gas turbine engine 20. The gas turbine engine 20 is disclosed herein as a two-spool turbo fan that generally incorporates a fan section 22, a compressor section 24, a combustor section 26 and a turbine section 28. The fan section 22 drives air along a bypass flowpath while the compressor section 24 drives air along a core flowpath for compression and communication into the combustor section 26 then expansion through the turbine section 28. Although depicted as a turbofan in the disclosed non-limiting embodiment, it should be appreciated that the concepts described herein are not limited to use with turbofans as the teachings may be applied to other types of turbine engine architectures.

The engine 20 generally includes a low spool 30 and a high spool 32 mounted for rotation about an engine central longitudinal axis A relative to an engine case structure 36 via several bearing compartments 38. The low spool 30 generally includes an inner shaft 40 that interconnects a fan 42, a low pressure compressor ("LPC") 44 and a low pressure turbine ("LPT") 46. The inner shaft 40 drives the fan 42 directly or through a geared architecture 48 to drive the fan 42 at a lower speed than the low spool 30. An exemplary reduction transmission is an epicyclic transmission, namely a planetary or star gear system.

The high spool 32 includes an outer shaft 50 that interconnects a high pressure compressor ("HPC") 52 and high pressure turbine ("HPT") 54. A combustor 56 is arranged between the high pressure compressor 52 and the high pressure turbine 54. The inner shaft 40 and the outer shaft 50 are concentric and rotate about the engine central longitudinal axis A which is collinear with their longitudinal axes.

Core airflow is compressed by the LPC 44 then the HPC 52, mixed with the fuel and burned in the combustor 56, then expanded over the HPT 54 and the LPT 46. The HPT 54 and the LPT 46 rotationally drive the respective high spool 32 and low spool 30 in response to the expansion.

Figure 2:
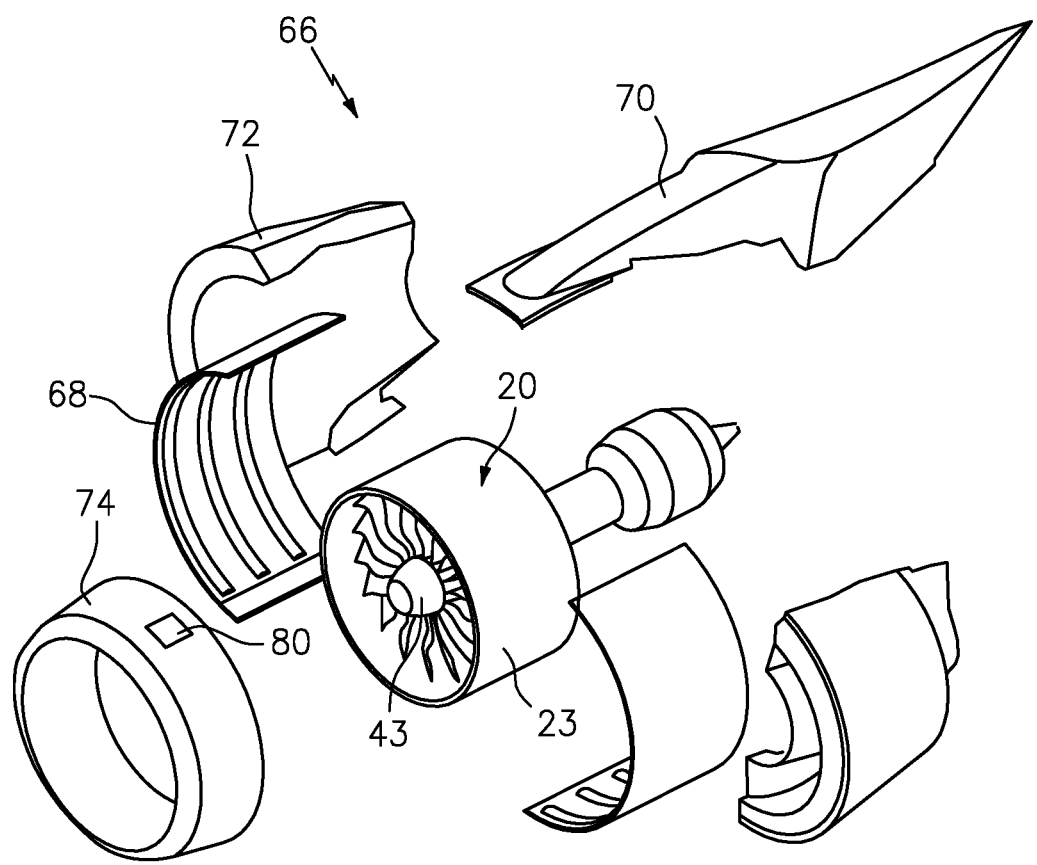
FIG. 2 is an exploded perspective view of a nacelle assembly for the gas turbine engine with a foreign object detection system.

With reference to FIG. 2, a nacelle assembly 66 for the engine 20 may include a fan cowl assembly 68, a pylon assembly 70, a thrust reverse cowl assembly 72, an inlet cowl 74 and/or other components and combinations thereof. The nacelle assembly 66 provides an aerodynamic fairing radially outward of the engine core and associated externals to provide an aerodynamically smooth, low-loss flowpath.

Figure 3:
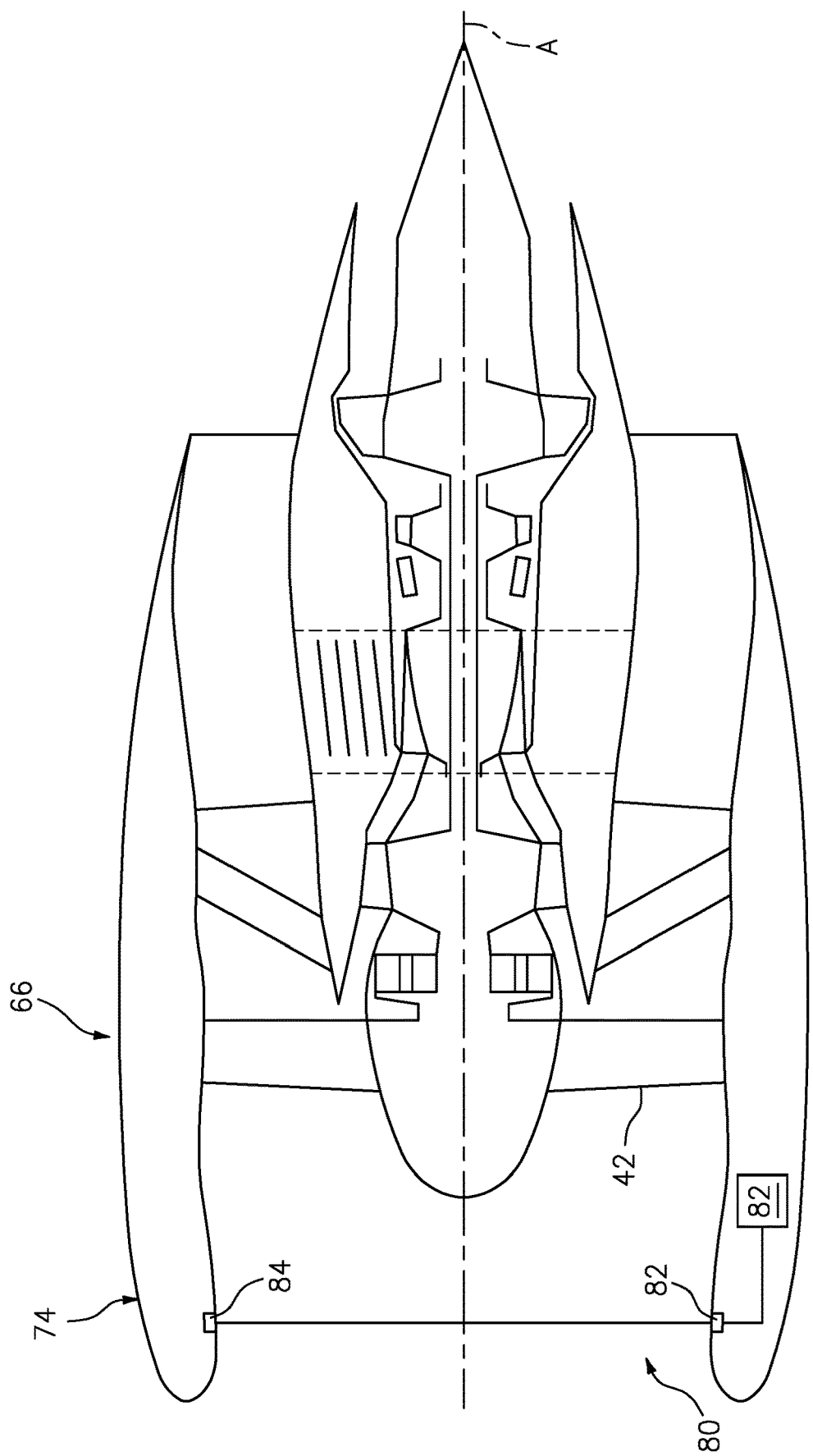
FIG. 3 is sectional view of a nacelle assembly for the gas turbine engine with the foreign object detection system.

With reference to FIG. 3, in one disclosed non-limiting embodiment, an detection system 80 is located in the nacelle assembly 66 such as in the inlet cowl 74. Alternatively, the detection system 80 may be located in a fan case 23 (FIG. 2).

Figure 4:
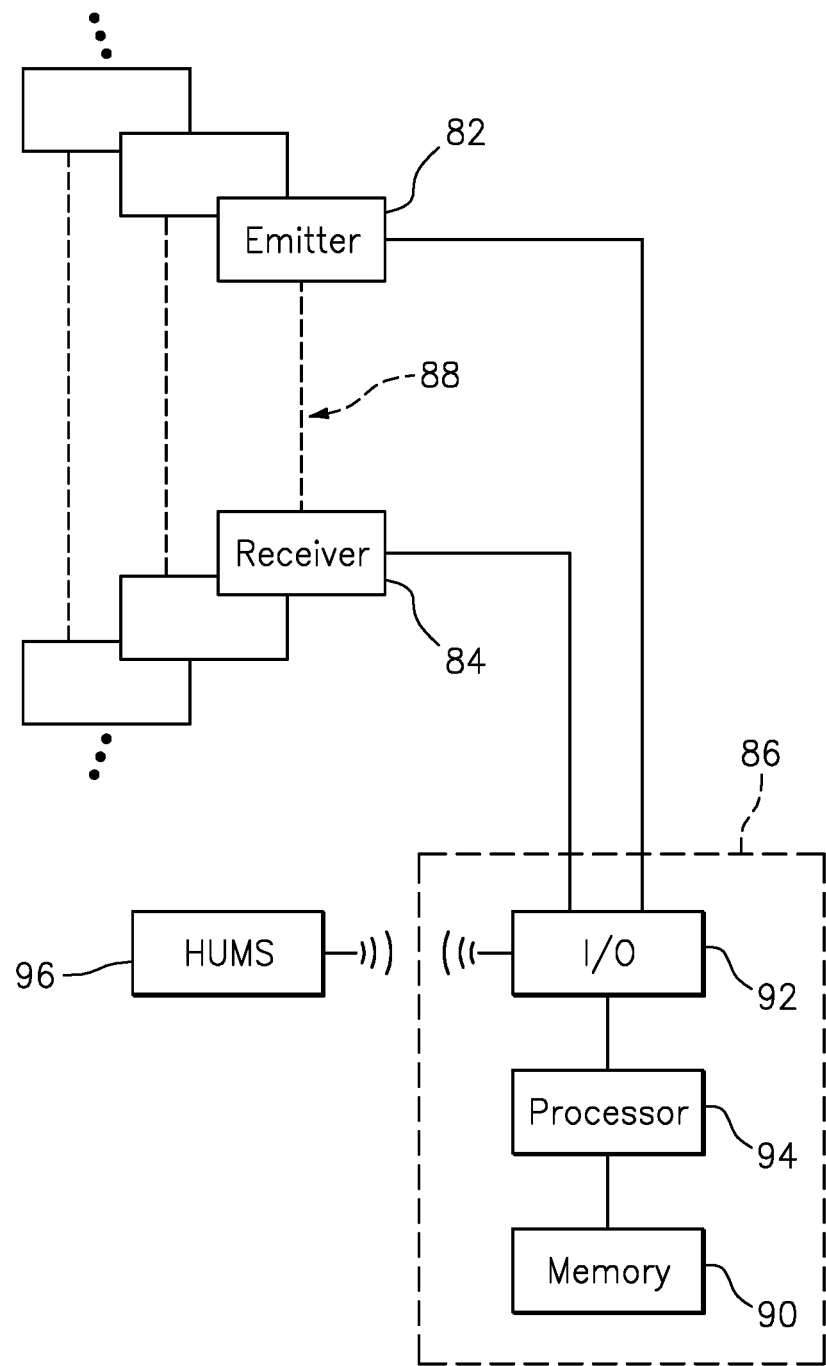
FIG. 4 is a schematic view of the foreign object detection system.

With reference to FIG. 4, the detection system 80 generally includes a multiple of emitters 82, a multiple of receivers 84, and a control system 86. The control system 86 may include at least one processor 94 (e.g., a controller, microprocessor, microcontroller, digital signal processor, etc.), memory 90, and an input/output (I/O) interface 92. The processor 94 and the I/O interface 92 are communicatively coupled to the memory 90. The memory 90 may be embodied as any type of computer memory device (e.g., volatile memory such as various forms of random access memory) which stores data and control algorithms such as the logic described herein. The I/O interface 92 is communicatively coupled to a number of hardware, firmware, and/or software components, including, for example, the emitters 82 and receivers 84, as well as remote systems 96 such as a ground station, Health and Usage Monitoring Systems (HUMS), or other system.

Figure 5:
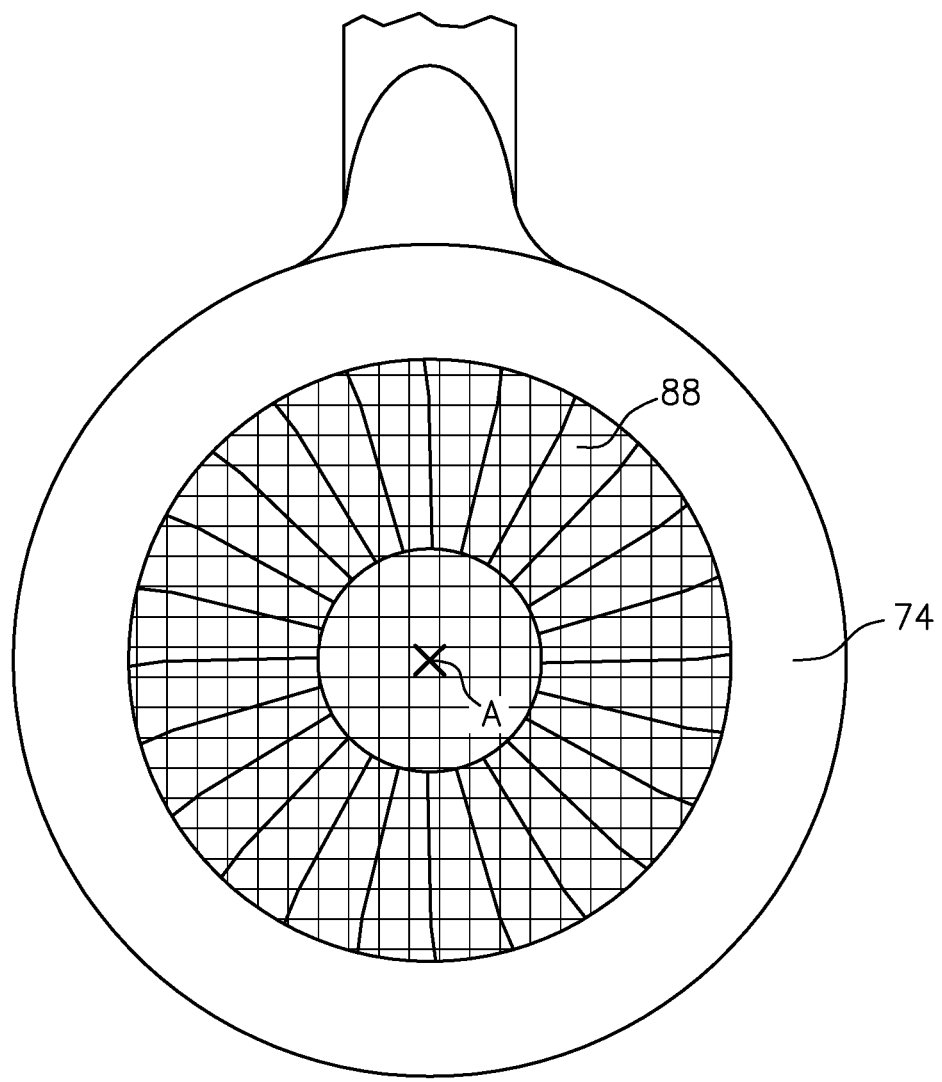
FIG. 5 is a schematic view of a beam matrix of the foreign object detection system according to one non-limiting embodiment.

Each of the multiple of emitters 82 may be, for example, medium intensity visible and/or infrared laser emitters that may be up to 5000 mW (5 watts) in power and are aimed to form a beam matrix 88 of beams in the inlet cowl 74 of the fan cowl assembly 68 upstream of the fan 42 (FIGS. 3 and 5). The beam matrix 88 may be configured so that a minimum sized object (e.g., a relatively small bird such as a sparrow or another object of a particular size) can be detected. That is, the desired minimum sized object may be utilized to define the number of beams and arrangement of beams in the beam matrix 88. Each emitter 82 may generate an about 0.125 inches (3.175 mm) diameter beam operating at a sample rate of at least 16,000 samples per second. Since the emitters 82 are relatively small, a relatively large number thereof (e.g., 10-1000) of emitters 82 and associated receivers 84 can be located about an inner periphery 76 of the fan cowl assembly 68.

Figure 6:
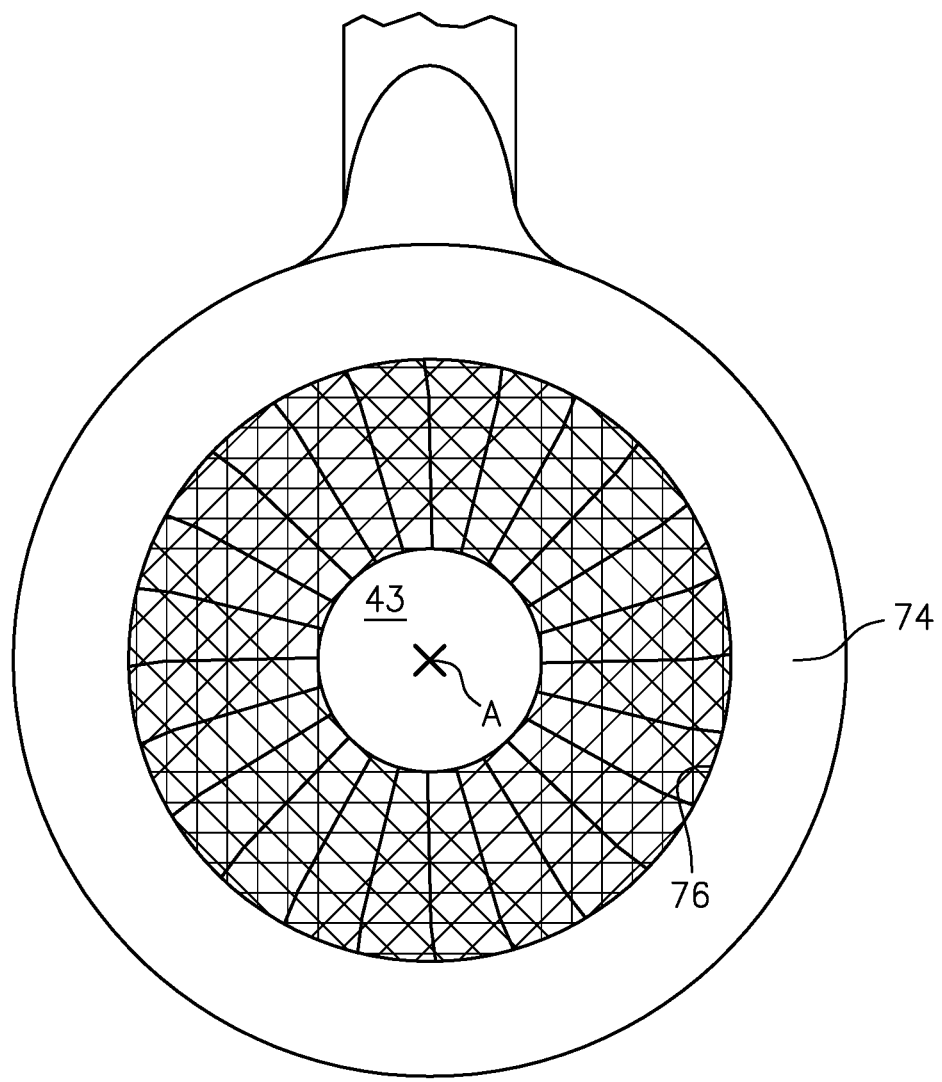
FIG. 6 is a schematic view of a beam matrix of the foreign object detection system according to another non-limiting embodiment.
Figure 7:
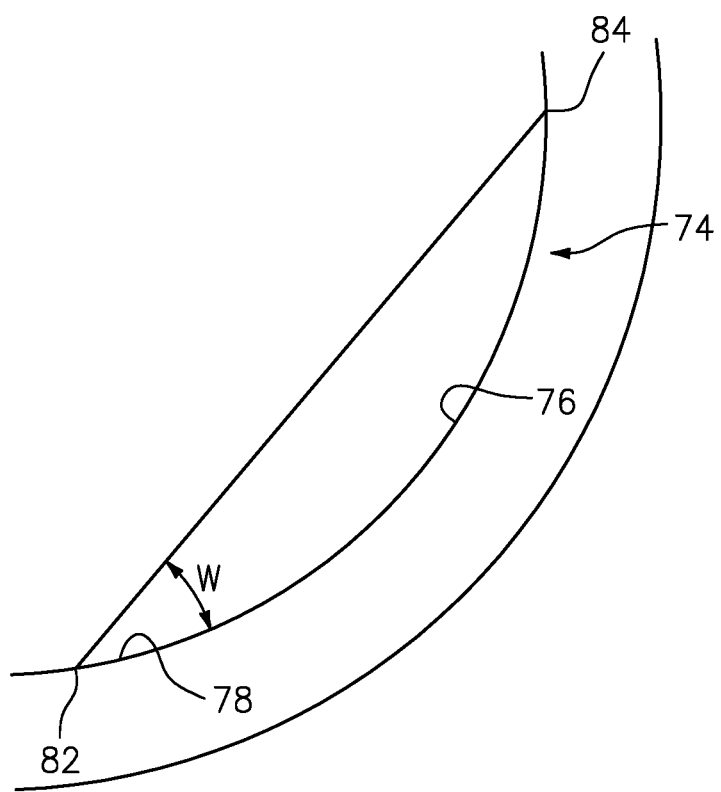
FIG. 7 is a schematic view of one beam of the beam matrix according illustrating a relationship with an inlet cowl.
Figure 8:
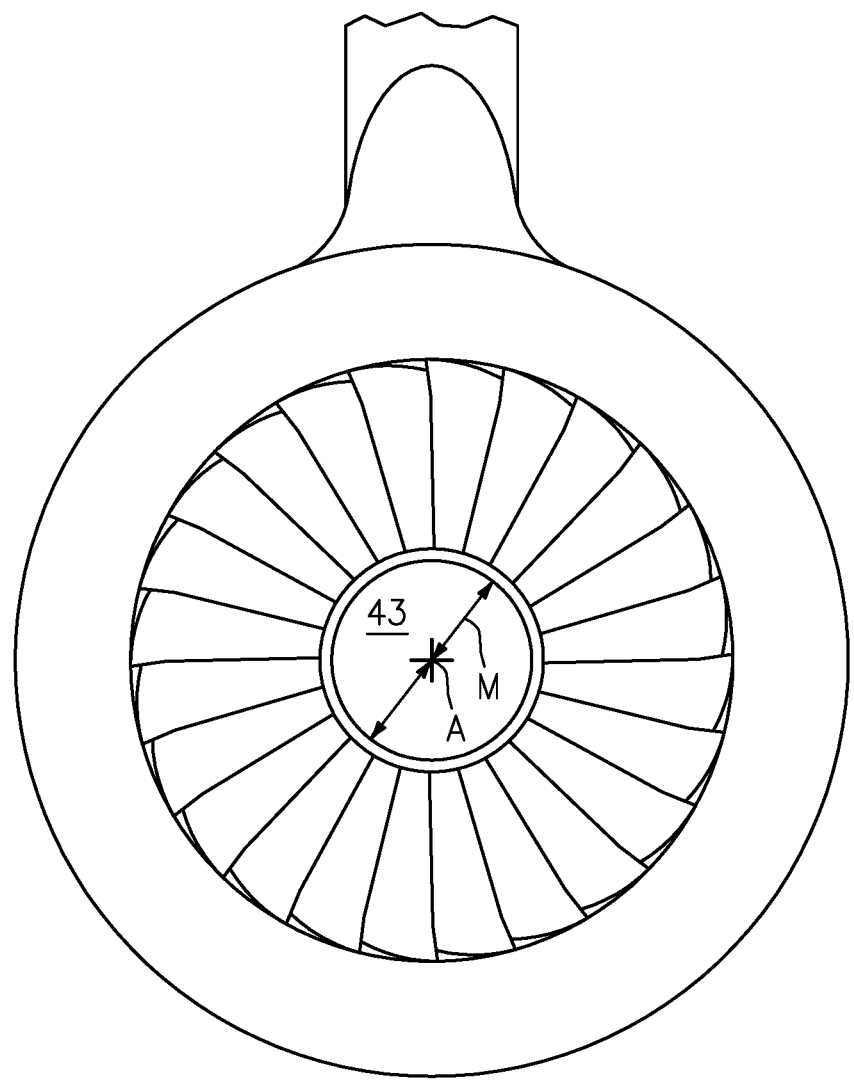
FIG. 8 is a schematic view of one beam of the beam matrix according illustrating a relationship with an inlet cowl.

In one embodiment, the beam matrix 88 may be arranged in a rectilinear pattern (FIG. 5). In another embodiment, the beam matrix 88 may be arranged such that the primary location of the beams are along the periphery 76 of the inlet cowl 74 (FIG. 6). That is, the beams between each pair of emitters 82 and receivers 84 are arranged about the inner periphery 76 of the inlet cowl 74 to form an angle W between about 20-45 degrees with respect to an inner surface 78 of the inner periphery 76 of the inlet cowl 74 (FIG. 7). This arrangement concentrates the beams toward the inner periphery 76 as the majority of bird strikes and FOD enters the engine away from a central nose cone 43 of the fan 42. In other words, the central area may have a lesser concentration of beams than the periphery of the inlet cowl 74. In this embodiment, the beams may be arranged to detect the minimum damaging sized object only outside of a minimum diameter M from the engine axis A that is greater than 10-30% of the diameter of the inner periphery 76 (FIG. 8).

Figure 9:
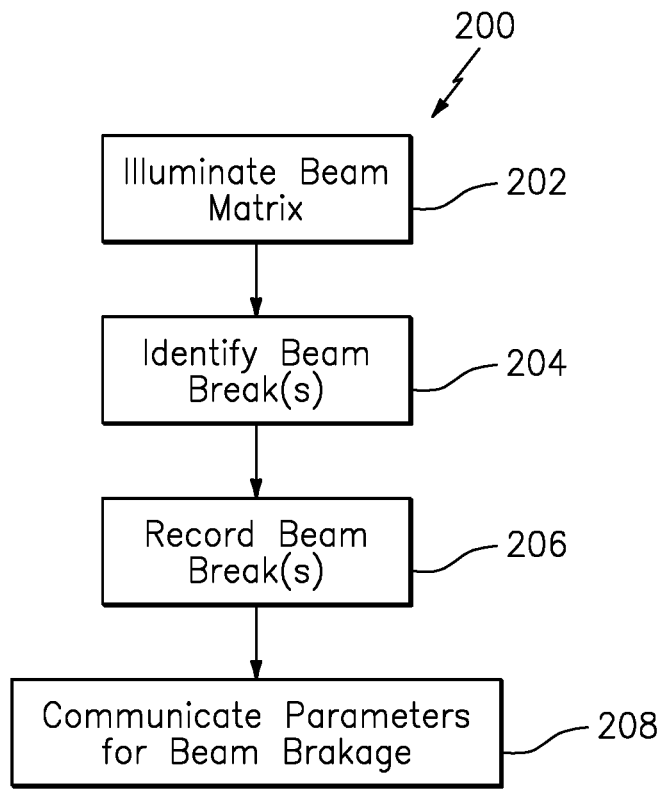
FIG. 9 is a bock diagram illustrating operation of the foreign object detection system according to one non-limiting embodiment.

With reference to FIG. 9, a method 200 for operation of the detection system 80 is disclosed in terms of functional block diagrams. The functions of the logic 124 are programmed software routines capable of execution in various microprocessor based electronics control embodiments and represented herein as the block diagrams. These functions may be enacted in either dedicated hardware circuitry or programmed software routines capable of execution in a microprocessor-based electronics control embodiment.

Initially, the beam matrix is generated (202) to detect a minimum sized object. Next, once the beam matrix is illuminated such as during taxi, takeoff, and climb operations, the control system 86 identifies (204) the breaking of any beams in the beam matrix should FOD of greater than the minimum sized object pass therethrough. Most FOD events occur between take-off and low climb at less than approximately 140 MPH (225 kph), however, the sample rate of at least 16,000 samples per second permits detection at up to 500 MPH (800 kph) which is sufficient to provide FOD identification during cruise.

Once one or more beams are broken, the control system 86 records (206) parameters of the breakage. Each beam of the beam matrix is discreet and provides an on/off signature that, for example, sets a bit in the control system 86 in response to the break of the respective beam. The control system 86 may record various parameters such as the number of beams which are broken, the time of the event, the duration of the event, etc. These parameters may be used to further categorize the object. Furthermore, the parameters may be communicated (208) to local or remote systems such as a Health and Usage Monitoring Systems (HUMS), or other system. Recognition of a FOD event facilitates determination of maintenance requirements such that scheduling thereof may be reduced.

Although particular step sequences are shown, described, and claimed, it should be appreciated that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be appreciated that within the scope of the appended claims, the disclosure may be practiced other than as specifically described. For that reason the appended claims should be studied to determine true scope and content.

What is claimed is:

1. A detection system for a gas turbine engine comprising:
   a multiple of emitters arranged about an inner periphery of an inlet cowl of a nacelle assembly;
   a multiple of receivers arranged about the inner periphery of the inlet cowl of the nacelle assembly, each of the multiple of receivers receiving a beam from one of the multiple of emitters to form a beam matrix, the beam matrix configured so that a central area of the inlet cowl has a lesser concentration of beams than a periphery within the inlet cowl; and
   a control system in communication with the multiple of emitters and the multiple of receivers, the control system operable to detect a minimum damaging sized object in response to breaking at least one beam of the beam matrix.

2. The system as recited in claim 1, wherein each beam is up to 5000 mW (5 watts) in power.

3. The system as recited in claim 1, wherein each beam is about 0.125 inches (3.175 mm) in diameter.

4. The system as recited in claim 1, wherein each beam is a laser beam.

5. The system as recited in claim 4, wherein each beam is in the infrared spectrum.

6. The system as recited in claim 1, wherein the beam matrix is rectilinear.

7. The system as recited in claim 6, wherein the minimum damaging sized object is 1 square inch.

8. The system as recited in claim 1, wherein the beams arranged about the inner periphery of the inlet cowl of the nacelle assembly detect the minimum damaging sized object.

9. The system as recited in claim 8, wherein the beams are arranged to detect the minimum damaging sized object only outside of a minimum diameter that defines the central area of the inlet cowl.

10. The system as recited in claim 9, wherein the minimum diameter is greater than 10-30% of the diameter of the inner periphery.

11. An inlet cowl for a gas turbine engine comprising:
    a multiple of emitters arranged about an inner periphery of the inlet cowl, the multiple of emitters located in a common plane transverse to a central axis of the inlet cowl; and
    a multiple of receivers arranged about the inner periphery of the inlet cowl within the common plane, each of the multiple of receivers operable to receive a laser beam from one of the multiple of emitters, the multiple of emitters and the multiple of receivers arranged to form a beam matrix to detect a minimum damaging sized object, the beam matrix configured so that a central area of the inlet cowl has a lesser concentration of beams than a periphery within the inlet cowl.

12. The inlet cowl assembly as recited in claim 11, wherein the beam matrix is rectilinear.

13. The inlet cowl assembly as recited in claim 11, wherein the beams are arranged to detect the minimum damaging sized object only outside of a minimum diameter that defines the central area of the inlet cowl, the minimum diameter greater than 10%-30% of the diameter of the inner periphery.

14. A method of foreign object debris (FOD) detection for a gas turbine engine, comprising:
    illuminating a multiple of receivers about an inner periphery of an inlet cowl by a multiple of emitters arranged about the inner periphery of the inlet cowl to form a beam matrix arranged to detect a minimum damaging sized object, the beam matrix configured so that a central area of an inlet cowl has a lesser concentration of beams than a periphery within the inlet cowl;
    identifying breaking of at least one beam of the beam matrix; and
    recording the breaking of the at least one beam.

15. The method as recited in claim 14, wherein illuminating the beam matrix comprises arranging the beam to detect the minimum damaging sized object only outside of a minimum diameter that defines the central area of the inlet cowl, the minimum diameter greater than 10%-30% of the diameter of the inner periphery.

16. The method as recited in claim 14, wherein illuminating the beam matrix comprises forming a rectilinear beam matrix.

17. The method as recited in claim 14, wherein the recording comprises setting a bit in a control system.

18. The method as recited in claim 14, wherein the recording comprises communicating with a Health and Usage Monitoring Systems (HUMS).

* * * * *